US012305673B1

(12) United States Patent
Li et al.

(10) Patent No.: US 12,305,673 B1
(45) Date of Patent: May 20, 2025

(54) METHODS FOR FAULT DIAGNOSIS OF PRESSURE SENSOR OF ELECTRO-HYDRAULIC SYSTEM WITH EXPLICIT CONTROLLER AND IMPLICIT CONTROLLER IN PARALLEL

(71) Applicants: EAST CHINA JIAOTONG UNIVERSITY, Jiangxi (CN); CHONGQING UNIVERSITY, Chongqing (CN)

(72) Inventors: Gang Li, Nanchang (CN); Diancheng Chen, Nanchang (CN); Ruqi Ding, Nanchang (CN); Min Cheng, Chongqing (CN); Liqiu Liao, Nanchang (CN); Zhanchao He, Nanchang (CN); Guoliang Hu, Nanchang (CN); Qianjie Liu, Nanchang (CN); Liping Zeng, Nanchang (CN)

(73) Assignees: EAST CHINA JIAOTONG UNIVERSITY, Nanchang (CN); CHONGQING UNIVERSITY, Chongqing (CN)

( * ) Notice: Subject to any disclaimer, the term of this patent is extended or adjusted under 35 U.S.C. 154(b) by 0 days.

(21) Appl. No.: 18/914,117

(22) Filed: Oct. 12, 2024

(30) Foreign Application Priority Data

Nov. 7, 2023 (CN) ........................ 202311469581.9

(51) Int. Cl.
*F15B 19/00* (2006.01)
*F15B 13/08* (2006.01)

(52) U.S. Cl.
CPC .......... *F15B 19/005* (2013.01); *F15B 13/086* (2013.01)

(58) Field of Classification Search
CPC ... F15B 11/0423; F15B 11/163; F15B 11/165; F15B 13/0417; F15B 2211/20546;
(Continued)

(56) References Cited

U.S. PATENT DOCUMENTS 5,240,041 A * 8/1993 Garnjost ............. F15B 13/0438 137/625.62
2016/0312728 A1* 10/2016 Ge ...................... F02D 41/0007
(Continued)

FOREIGN PATENT DOCUMENTS

CN 113656985 A 11/2021
CN 115750511 A 3/2023
(Continued)

OTHER PUBLICATIONS

Paolo Rocco et al., Implicit Force Control for Industrial Robots in Contact with Stiff Surfaces, Automatica, vol. 33, No. 11, pp. 2040-2047, 1997.*
(Continued)

*Primary Examiner* — Alexander Satanovsky
(74) *Attorney, Agent, or Firm* — Porus IP LLC

(57) ABSTRACT

A method for fault diagnosis of a pressure sensor of an electro-hydraulic system with an explicit controller and an implicit controller in parallel is provided. The method may include receiving parameter information of the electro-hydraulic system; estimating a first chamber pressure of the hydraulic actuator online by utilizing a second chamber pressure of the hydraulic actuator; obtaining valve opening signals of the explicit controller and the implicit controller in a valve controller; converting the valve opening signals are difference-calculated to obtain two residual signals; and the residuals of an independent metering valve 1 and an independent metering valve 2 are compared with a preset threshold, respectively, to identify whether the independent
(Continued)

metering valve 1 and the independent metering valve 2 are faulty or not. The method is simple to operate, has a fast response time and low cost for troubleshooting, and improves the diagnostic accuracy and coverage of the electro-hydraulic system.

7 Claims, 7 Drawing Sheets

(58) Field of Classification Search
CPC .. F15B 2211/40507; F15B 2211/40515; F15B 2211/45; F15B 2211/6054; F15B 2211/6306; F15B 2211/6309; F15B 2211/6346; F15B 2211/253; F15B 2211/353; F15B 2211/50563; F15B 2211/6051; F15B 2211/30535; F15B 21/087; F15B 2211/327; F15B 2211/20515; F15B 2211/20523; F15B 2211/351; F15B 2211/415; F15B 2211/41581; F15B 2211/426; F15B 2211/50536; F15B 2211/513; F15B 2211/5157; F15B 2211/528; F15B 2211/6313
See application file for complete search history.

(56) References Cited

U.S. PATENT DOCUMENTS

2023/0061016 A1* 3/2023 Jayaraman .............. H02P 27/08
2024/0200582 A1* 6/2024 Wang .................. F15B 13/0807

FOREIGN PATENT DOCUMENTS

CN 115898986 A 4/2023
CN 116447191 A 7/2023

OTHER PUBLICATIONS

Winkler A. et al., "Explicit and implicit force control of an industrial manipulator An experimental summary", International Conference on Methods and Models in Automation and Robotics (MMAR), IEEE, 2016, pp. 19-24.*
Mingjie Li et al., "Parallel Velocity Control of an Electro-Hydraulic Actuator With Dual Disturbance Observers", IEEE Access, Digital Object Identifier 10.1109/ACCESS.2019.2911658.*
Shi-jie Su et al., "Dual-valve parallel prediction control for an electro-hydraulic servo system", Science Progress, 2020, vol. 103(1) 1-21.*
Decision to Grant a Patent in Chinese Application No. 202311469581.9 mailed on May 20, 2024, 5 pages.

* cited by examiner

METHODS FOR FAULT DIAGNOSIS OF PRESSURE SENSOR OF ELECTRO-HYDRAULIC SYSTEM WITH EXPLICIT CONTROLLER AND IMPLICIT CONTROLLER IN PARALLEL

CROSS-REFERENCE TO RELATED APPLICATIONS

This application claims priority to Chinese application No. 202311469581.9 filed on Nov. 7, 2023, the entire contents of which are incorporated herein by reference.

TECHNICAL FIELD

The present disclosure relates to the technical field of fault diagnosis of a pressure sensor of an electro-hydraulic system, and in particular, relates to a method for fault diagnosis of a pressure sensor of an electro-hydraulic system with an explicit controller and an implicit controller in parallel.

BACKGROUND

An independent metering control system increases a degree of freedom of control through structural decoupling of inlet and outlet adjusts independently inlet and outlet valve spools, and adjusts a back pressure under variable operating conditions to save energy. Additionally, the increased degree of freedom allows for a wide variety of operating modes, which enables energy regeneration and recovery. The independent metering control system has become the development trend of the electro-hydraulic system in the future, but the independent metering control system includes a large number of electronic feedback and control devices. Once a pressure sensor is faulty, the control strategy may be difficult to achieve the required dynamic response, which may also lead to a large system shock, and a safety accident may occur during the construction operation.

The independent metering control system generally includes four pressure sensors and two independent metering valves. The pressure sensors are responsible for detecting the pressure changes at both ends of independent metering valves. However, the independent metering control system generally experiences vibration conditions during use, and the external initial vibration is relatively large, which makes the pressure sensors connected to the hydraulic cylinder susceptible to vibration. The pressure sensors in two chambers of the hydraulic actuator usually operate in harsh environments such as high temperature, high pressure, and high humidity, and are subjected to long-term impacts and erosion from the oil. In addition, during the operating process of the electro-hydraulic system, there are frequent startups, shutdowns, velocity changes, or reversals of action, which may also lead to instantaneous huge pressure shocks within the system, and may be very likely to cause two-chamber pressure sensor of the hydraulic actuator to fail. Fault diagnosis and detection of the pressure sensors of the traditional electro-hydraulic system in specific fields can meet current requirements, but fault diagnosis of the pressure sensors of the more advanced independent metering control system has problem such as incompatible cost and accuracy, long troubleshooting times, etc.

Therefore, a method for fault diagnosis of a pressure sensor of an electro-hydraulic system with an explicit controller and an implicit controller in parallel is provided, which helps to quickly perform fault diagnosis and improve the diagnostic accuracy and coverage of the electro-hydraulic system.

SUMMARY

One of some embodiments of the present disclosure provides a method for fault diagnosis of a pressure sensor of an electro-hydraulic system with an explicit controller and an implicit controller in parallel. The method may be implemented by a processor and may include receiving parameter information of the electro-hydraulic system, the parameter information including a first chamber pressure of a hydraulic actuator and a second chamber pressure of the hydraulic actuator; obtaining an online estimate value of the first chamber pressure by estimating, based on the second chamber pressure, the first chamber pressure online; obtaining, based on the first chamber pressure, an opening signal of an independent metering valve 1 controlled by the explicit controller, and obtaining, based on the online estimate value of the first chamber pressure, an opening signal of the independent metering valve 1 controlled by the implicit controller; obtaining, based on the second chamber pressure, an opening signal of an independent metering valve 2 controlled by the explicit controller using a pressure control loop, and obtaining, based on a reference velocity of the hydraulic actuator, an opening signal of the independent metering valve 2 controlled by the implicit controller using a flow control loop; determining a first residual of the independent metering valve 1 by performing subtraction on the opening signal of the independent metering valve 1 controlled by the implicit controller and the opening signal of the independent metering valve 1 controlled by the explicit controller, and determining a second residual of the independent metering valve 2 by performing subtraction on the opening signal of the independent metering valve 2 controlled by the implicit controller and the opening signal of the independent metering valve 2 controlled by the explicit controller; and identifying whether the independent metering valve 1 and the independent metering valve 2 are faulty by comparing the first residual and the second residual respectively with preset thresholds corresponding to the first residual and the second residual.

In some embodiments, the obtaining an online estimate value of the first chamber pressure by estimating, based on the second chamber pressure online, the first chamber pressure may include: designing a tracking controller $G_{Tr}$ of the first chamber pressure:

$$G_{Tr} = \frac{2\xi\omega_n s + \omega_n^2}{K_p s^2 + K_i s},$$

where s denotes a transfer function after a Laplace transform of a first differential link, $K_p$ denotes a proportional adjustment coefficient, $K_i$ denotes an integral adjustment coefficient, and $\omega_n$ and $\xi$ denote a closed-loop intrinsic frequency and damping of the controller; and the online estimate value is determined according to a following equation:

$$\hat{p}_1 = \frac{G_{Tr}G_{Pl}}{1 + G_{Tr}G_{Pl}} p_1 + \frac{G_{Pl}}{1 + G_{Tr}G_{Pl}} (p_{2,ref} - p_2),$$

where $$G_{PI} = K_p + K_i\frac{1}{s}, \hat{p}_1$$

denotes the online estimate value, $p_1$ denotes the first chamber pressure, $p_2$ denotes the second chamber pressure, $p_{2,ref}$ denotes a preset target reference pressure, and $G_{PI}$ denotes a proportional integral controller.

In some embodiments, the obtaining, based on the first chamber pressure, an opening signal of an independent metering valve 1 controlled by the explicit controller may include: adopting the flow control loop for the independent metering valve 1 controlled by the explicit controller and determining the opening signal of the independent metering valve 1 controlled by the explicit controller according to a following equation: $u_1=u^{-1}(v_{ref}A_1, p_s-p_1)$, where $u_1$ denotes the opening signal, $v_{ref}$ denotes the reference velocity of the hydraulic actuator, $A_1$ denotes an area of a rodless chamber of the hydraulic actuator, $p_s$ denotes a pressure of the electro-hydraulic system, $p_1$ denotes the first chamber pressure, $u^{-1}(q_{ref}, \Delta p_1)$ denotes a valve opening calibrated in advance using a reference flow and a differential pressure, $q_{ref}$ denotes a product of the reference velocity $v_{ref}$ and the area $A_1$ of the rodless chamber, and $\Delta p_1$ denotes a difference between the pressure $p_s$ of the electro-hydraulic system and the first chamber pressure $p_1$.

In some embodiments, the obtaining, based on the online estimate value of the first chamber pressure, an opening signal of the independent metering valve 1 controlled by the implicit controller may include: adopting the flow control loop for the independent metering valve 1 controlled by the implicit controller and determining the opening signal u of the independent metering valve 1 controlled by the implicit controller according to a following equation: $u_1'=u^{-1}(v_{ref}A_1, p_s-\hat{p}_1)$, where $\hat{p}_1$ denotes the online estimate value of the first chamber pressure, $u^{-1}(q_{ref}, \Delta p_1)$ denotes a valve opening calibrated in advance using a reference flow and a differential pressure, and $\Delta p_1'$ denotes a difference between the pressure $p_s$ of the electro-hydraulic system and the online estimate value $\hat{p}_1$.

In some embodiments, the obtaining, based on the second chamber pressure, an opening signal of an independent metering valve 2 controlled by the explicit controller using a pressure control loop may include: adopting the pressure control loop for the independent metering valve 2 controlled by the explicit controller and determining the opening signal $u_2$ of the independent metering valve 2 controlled by the explicit controller according to a following equation:

$$u_2 = K_p \cdot (p_2 - p_{2,ref}) + K_i\int_t^{t_i}(p_2 - p_{2,ref})dt,$$

where $u_2$ denotes the opening signal, $p_2$ denotes the second chamber pressure, $p_{2,ref}$ denotes the preset target reference pressure, t denotes an integration starting time, and $t_i$ denotes an integration termination time.

In some embodiments, the obtaining, based on a reference velocity of the hydraulic actuator, an opening signal of the independent metering valve 2 controlled by the implicit controller using a flow control loop may include: adopting the flow control loop for the independent metering valve 2 controlled by the implicit controller and determining the opening signal $u_2'$ of the independent metering valve 2 controlled by the implicit controller according to a following equation: $u_2'=u^{-1}(v_{ref}A_2, p_2-p_r)$, where $A_2$ denotes an area of a rod chamber of the hydraulic actuator, $p_r$ denotes a return oil pressure, $u^{-1}(q_{ref}', \Delta p_2)$ denotes a valve opening calibrated in advance using a reference flow and a differential pressure, $q_{ref}'$ denotes a product of the reference velocity $v_{ref}$ and the area $A_2$ of the rod chamber, and $\Delta p_2$ denotes a difference between the second chamber pressure $p_2$ and the return oil pressure $p_r$.

In some embodiments, the identifying whether the independent metering valve 1 and the independent metering valve 2 are faulty by comparing the first residual and the second residual respectively with preset thresholds corresponding to the first residual and the second residual may include: determining whether the first residual exceeds the preset threshold corresponding to the first residual; in response to a determination that the first residual does not exceed the preset threshold corresponding to the first residual, determining whether the second residual exceeds the preset threshold corresponding to the second residual; in response to a determination that the second residual exceeds the preset threshold corresponding to the second residual, determining that a signal is abnormal; or in response to a determination that the second residual does not exceed the preset threshold corresponding to the second residual, determining that a first chamber pressure sensor of the hydraulic actuator and a second chamber pressure sensor of the hydraulic actuator are fault free.

In some embodiments, the determining whether the first residual exceeds the preset threshold corresponding to the first residual may further include: in response to a determination that the first residual exceeds the preset threshold corresponding to the first residual, determining whether the second residual exceeds the preset threshold corresponding to the second residual; in response to a determination that the second residual exceeds the preset threshold corresponding to the second residual, determining that at least the second chamber pressure sensor of the hydraulic actuator is faulty; or in response to a determination that the second residual does not exceed the preset threshold corresponding to the second residual, determining that the first chamber pressure sensor of the hydraulic actuator is faulty.

One of the embodiments of the present disclosure provides a device for fault diagnosis of a pressure sensor of an electro-hydraulic system with an explicit controller and an implicit controller in parallel. The device may include at least one processor and a storage medium. The storage medium may be configured to store instructions. The processor may be configured to operate according to the instructions to perform the method for fault diagnosis of a pressure sensor of an electro-hydraulic system with an explicit controller and an implicit controller in parallel.

One of the embodiments of the present disclosure provides a non-transitory computer-readable storage medium storing a computer program. When executed by a processor, the computer program may perform the method for fault diagnosis of a pressure sensor of an electro-hydraulic system with an explicit controller and an implicit controller in parallel.

Some embodiments of the present disclosure may include at least the following beneficial effects.

(1) The implicit controller may be designed by exploring the system analytical redundancy instead of adding additional hardware, the residual of the independent metering valve 1 and the independent metering valve 2 may be calculated through the valve opening signals obtained by the explicit controller and the implicit controller, and the fault diagnosis may be performed on the two-chamber pressure sensor of the hydraulic actuator, which increases a count of residuals used for diagnosis, and improves the accuracy and coverage rate of the fault diagnosis.

(2) A system state variable may be estimated online using the analytical redundancy of the independent metering control system, which provides theoretical support for designing the implicit controller. In addition, the method for fault diagnosis of a pressure sensor of an electro-hydraulic system with an explicit controller and an implicit controller in parallel eliminates the need to build a complex and accurate hydraulic system model, and avoids the influence of model inaccuracy on diagnostic performance.

(3) The simple process reduces the time and cost of fault diagnosis, and the fault may be adjusted and repaired in time with the fast response time of fault diagnosis, which ensures that the system works normally, improves the safety performance of the system, and reduces the accidents.

(4) The diagnostic coverage and accuracy are comprehensively considered without increasing the cost, which ensures the competitiveness of the system in the market. In this case, the fault diagnosis of hydraulic actuator two-chamber pressure sensor of the independent metering control system is of great necessity and significance.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 1:
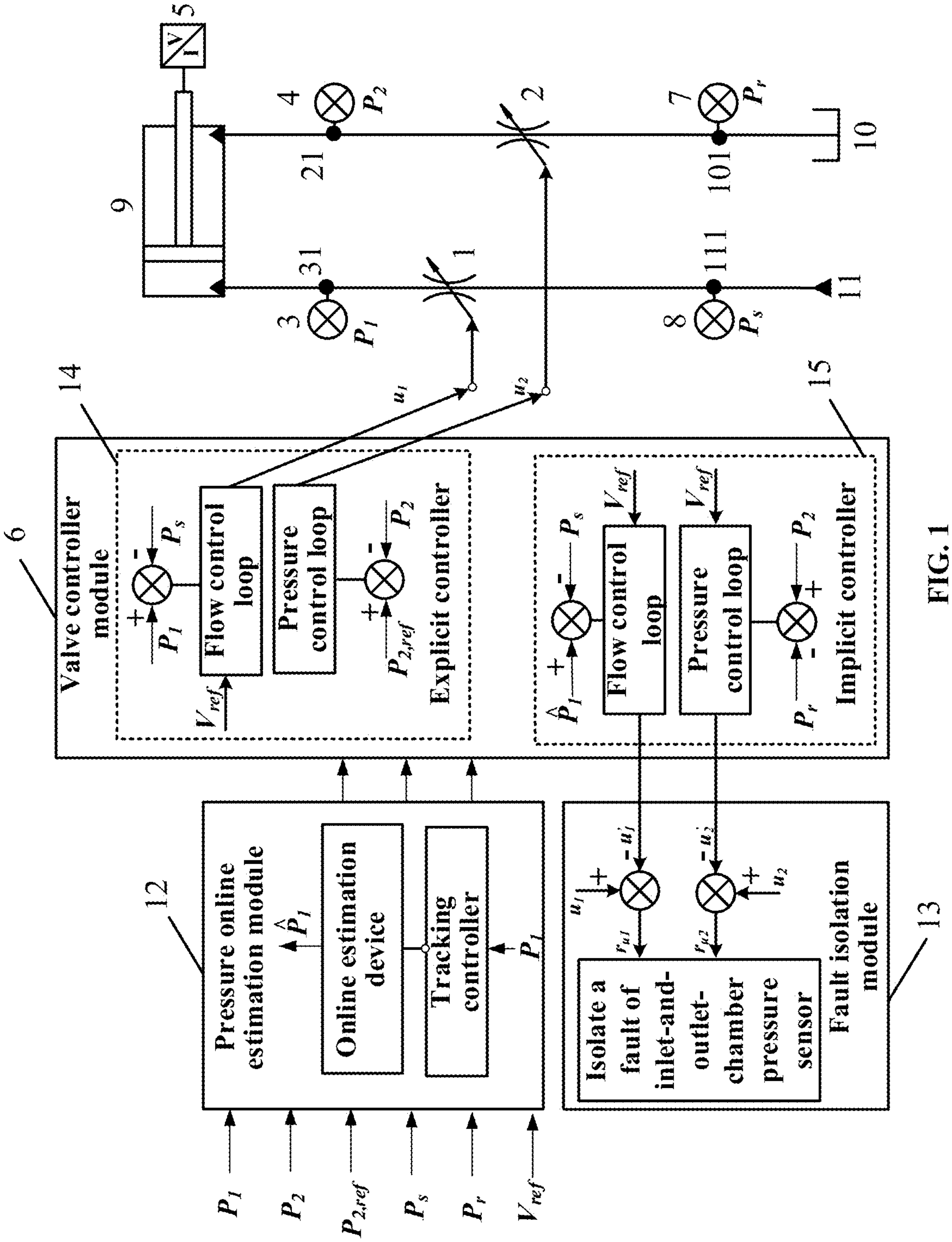
FIG. 1 is a schematic diagram illustrating an exemplary method for fault diagnosis of a pressure sensor of an electro-hydraulic system with an explicit controller and an implicit controller in parallel according to some embodiments of the present disclosure.

In the figures, 1, independent metering valve 1; 2, independent metering valve 2; 3, first chamber pressure sensor of the hydraulic actuator; 4, second chamber pressure sensor of the hydraulic actuator; 5, velocity sensor; 6, valve controller module; 7, return oil pressure sensor; 8, system pressure sensor; 9, hydraulic actuator; 10, oil tank; 11, power source; 31, first actuator node; 21, second actuator node; 101, return oil tank node; 111, power source output node; 12, pressure online estimation module; 13, fault isolation module; 14, explicit controller; and 15, implicit controller.

DETAILED DESCRIPTION

In order to more clearly illustrate the technical solutions relating to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

It should be noted that "hydraulic actuator two-chamber pressure sensor" refers to a combined term of "first chamber pressure sensor of the hydraulic actuator" and "second chamber pressure sensor of the hydraulic actuator", and also refers to pressure sensors at two ends of the hydraulic actuator. "Explicit and implicit dual controllers" refers to a combined term of "explicit controller" and "implicit controller," which are both included in a valve controller module. In addition, in order to make the accompanying drawings clear and easy to understand, some parts are simplified for illustration, so that those skilled in the art can understand the specific meaning of the markings of the accompanying drawings according to the specific situation.

FIG. 1 is a schematic diagram illustrating an exemplary method for fault diagnosis of a pressure sensor of an electro-hydraulic system with an explicit controller and an implicit controller in parallel according to some embodiments of the present disclosure.

As shown in FIG. 1, an independent metering control system may include an independent metering valve 1 and an independent metering valve 2, a hydraulic actuator 9, a first chamber pressure sensor 3 of the hydraulic actuator, a second chamber pressure sensor 4 of the hydraulic actuator, a velocity sensor 5, a valve controller module 6, a return oil pressure sensor 7, a system pressure sensor 8, an oil tank 10, a power source 11, a pressure online estimation module 12, a fault isolation module 13, an explicit controller 14 and an implicit controller 15.

The independent metering valve 1 and the independent metering valve 2 may be control valves in the electro-hydraulic system. In some embodiments, the independent metering valve 1 and the independent metering valve 2 may both be three-position four-way electro-proportional directional valves.

The first chamber pressure sensor 3 refers to a sensor configured to monitor a first chamber pressure of the hydraulic actuator. The second chamber pressure sensor 4 refers to a sensor configured to monitor a second chamber pressure of the hydraulic actuator. More descriptions of the first chamber pressure and the second chamber pressure may be found in FIG. 2 and the relevant descriptions thereof. In some embodiments, the first chamber pressure sensor 3 may be mounted at a first actuator node 31, and the second chamber pressure sensor 4 may be mounted at a second actuator node 21. The first chamber pressure sensor 3 and the second chamber pressure sensor 4 may be mounted at one end of the independent metering valve 1 and the independent metering valve 2 close to the hydraulic actuator 9 respectively.

The velocity sensor 5 refers to a sensor configured to monitor a velocity of the hydraulic actuator in the electro-hydraulic system. In some embodiments, the velocity sensor 5 may be mounted on one side of a piston rod in the hydraulic actuator.

The valve controller module 6 refers to a module that adjusts an opening of a valve. In some embodiments, the valve controller module may include the explicit controller 14 and the implicit controller 15. The explicit controller 14 may determine an opening signal of the valve based on an actual parameter of the electro-hydraulic system. The implicit controller may determine an opening signal of the valve based on an estimated parameter of the electro-hydraulic system.

The return oil pressure sensor 7 refers to a sensor configured to monitor a return oil pressure. The system pressure sensor 8 refers to a sensor configured to monitor a pressure of an electro-hydraulic system. In some embodiments, the system pressure sensor 8 may be mounted at a power source output node 111, and the return oil pressure sensor 7 may be mounted at a return oil tank node 101, i.e., the system pressure sensor 8 and the return oil pressure sensor 7 may be mounted at one end of the independent metering valve 1 and the independent metering valve 2 away from the hydraulic actuator 9 respectively.

The hydraulic actuator 9 refers to a device that converts compressed hydraulic motion into mechanical linear or rotary motion. The oil tank 10 refers to a container configured to store oil in the electro-hydraulic system. The power source 11 refers to a device that provides power in the electro-hydraulic system. The power source 11 may be a hydraulic pump. For example, the power source may include a vane pump, a piston pump, a gear pump, etc.

The pressure online estimation module 12 refers to a module configured to estimate the pressure online. In some embodiments, the pressure online estimation module may be a software module in the processor. The pressure online estimation module may include an online estimation device and a tracking controller.

The fault isolation module 13 refers to a module configured to isolate a fault of inlet-and-outlet-chamber pressure sensor.

Figure 2:
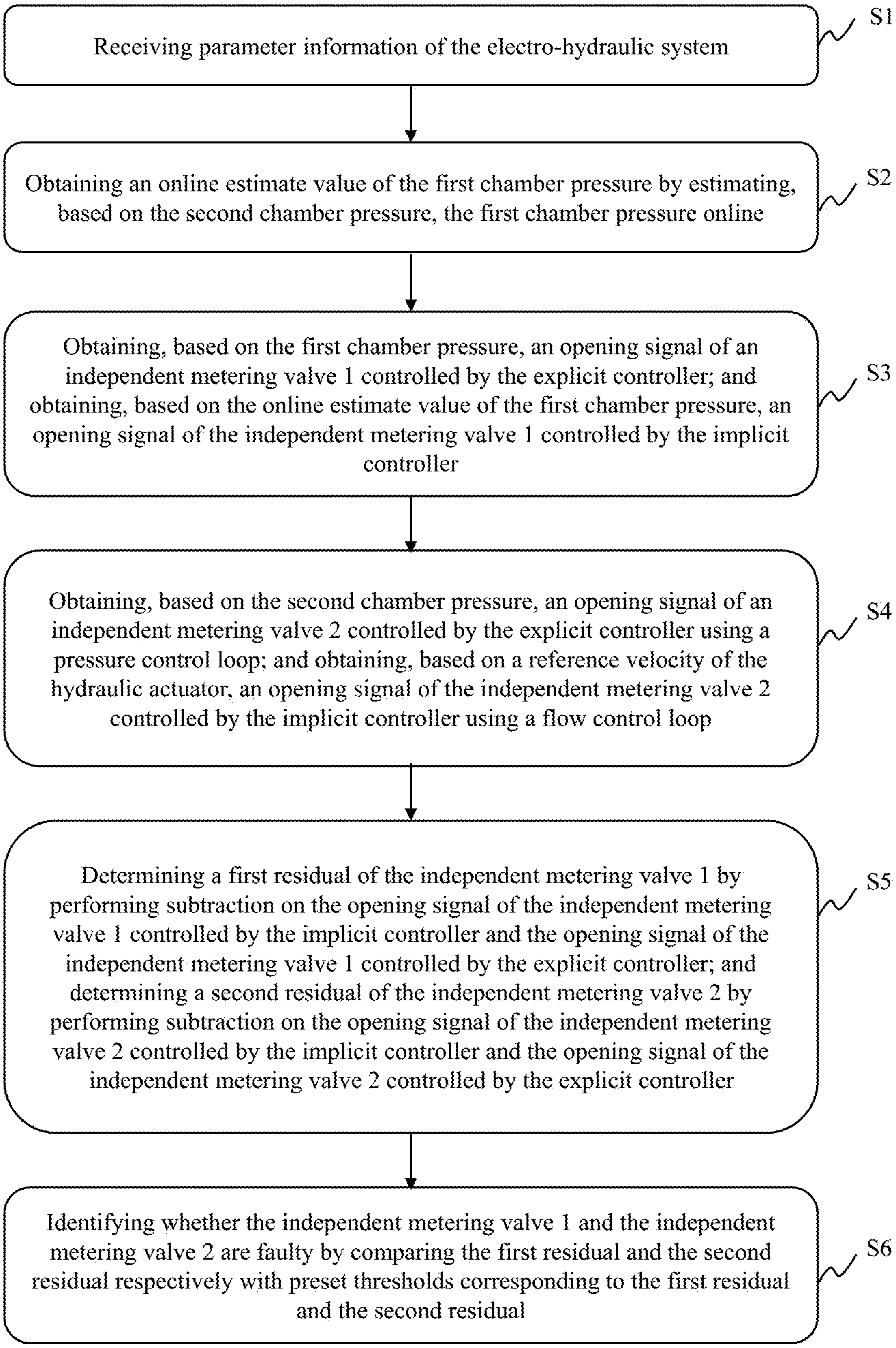
FIG. 2 is a flowchart illustrating an exemplary process for fault diagnosis of a pressure sensor of an electro-hydraulic system with an explicit controller and an implicit controller in parallel according to some embodiments of the present disclosure.

FIG. 2 is a flowchart illustrating an exemplary process for fault diagnosis of a pressure sensor of an electro-hydraulic system with an explicit controller and an implicit controller in parallel according to some embodiments of the present disclosure.

In some embodiments, the process for fault diagnosis of a pressure sensor of an electro-hydraulic system with an explicit controller and an implicit controller in parallel may be implemented by a processor. As shown in FIG. 2, the process may include the following operations.

In S1, parameter information of the electro-hydraulic system may be received.

The electro-hydraulic system refers to a feedback control system including an electrical signal processing device and a hydraulic power mechanism. In some embodiments, the electro-hydraulic system may be an independent metering control system. A main structure and more descriptions of the independent metering control system may be found in FIG. 1 and the related descriptions thereof.

The parameter information refers to information related to a pressure of the electro-hydraulic system. In some embodiments, the parameter information may include a first chamber pressure of the hydraulic actuator and a second chamber pressure of the hydraulic actuator.

The first chamber pressure refers to a pressure inside a first chamber in the hydraulic actuator. The first chamber refers to a rodless chamber of the hydraulic actuator, i.e., a chamber that does not include a piston rod in the hydraulic actuator.

The second chamber pressure refers to a pressure inside a second chamber in the hydraulic actuator. The second chamber refers to a rod chamber of the hydraulic actuator, i.e., a chamber that includes the piston rod in the hydraulic actuator.

In some embodiments, the processor may receive the parameter information of the electro-hydraulic system based on the pressure sensor in the electro-hydraulic system. For example, the processor may obtain the first chamber pressure based on a first chamber pressure sensor, and obtain the second chamber pressure based on a second chamber pressure sensor. Δpressure value obtained by the pressure sensor may be an actual measured pressure value. More descriptions of the first chamber pressure sensor and the second chamber pressure sensor may be found in the descriptions of FIG. 1.

In S2, an online estimate value of the first chamber pressure may be obtained by estimating, based on the second chamber pressure, the first chamber pressure online.

The online estimate value refers to an estimate value of the first chamber pressure.

In some embodiments, the processor may design a tracking controller of the first chamber pressure. The designed tracking controller may be configured in a pressure online estimation module. An online estimation device in the pressure online estimation module may obtain the online estimate value of the first chamber pressure based on the tracking controller and the second chamber pressure.

The tracking controller refers to a device that tracks the first chamber pressure.

In some embodiments, the processor may design the tracking controller $G_{Tr}$ of the first chamber pressure of the hydraulic actuator according to the following equation (1):

$$G_{Tr} = \frac{2\xi\omega_n s + \omega_n^2}{K_p s^2 + K_i s}, \quad (1)$$

where s denotes a transfer function after a Laplace transform of a first differential link, $K_p$ denotes a proportional adjustment coefficient, $K_i$ denotes an integral adjustment coefficient, and on and § denote a closed-loop intrinsic frequency and damping of the controller. In some embodiments of the present disclosure, the parameters may be determined according to an actual operating condition.

In some embodiments, the processor (e.g., the online estimation device in the pressure online estimation module) may perform a difference calculation based on the second chamber pressure of the hydraulic actuator and a preset target reference pressure, obtain a sum of the difference value and an output value of the tracking controller as an input, and synthetically obtain, by performing a proportional control and an integral control on the input, the online estimate value of the first chamber pressure of the hydraulic actuator.

The target reference pressure refers to a target value of the second chamber pressure, which may be preset based on actual demand.

The performing the proportional control on the input means that when there is a deviation between the output and the input of the tracking controller, the deviation may be reduced by multiplying the deviation between the output and the input by a preset proportional value. The performing the integral control on the input means that the deviation is further reduced by integrating the deviation between the output and the input of the tracking controller. In some embodiments, the processor may perform the proportional control and the integral control on the input, so that the output of the tracking controller may proportionally reflect integrals of the input and the input, thereby obtaining the online estimate value of the first chamber pressure of the hydraulic actuator.

In some embodiments, the processor (e.g., the online estimation device in the pressure online estimation module) may determine the online estimate value $\hat{p}_1$ according to the following equation (2):

$$\hat{p}_1 = \frac{G_{Tr}G_{PI}}{1 + G_{Tr}G_{PI}} p_1 + \frac{G_{PI}}{1 + G_{Tr}G_{PI}} (p_{2,ref} - p_2), \quad (2)$$

where $p_1$ denotes the first chamber pressure, $p_2$ denotes the second chamber pressure, $p_{2,ref}$ denotes a preset target reference pressure, and $G_{PI}$ denotes a proportional integral controller. In some embodiments, when only integral gain and proportional gain are considered, $$G_{PI} = K_p + K_i \frac{1}{s}.$$

Considering the integral gain means that increase or decrease of the output of the tracking controller depends on a time accumulation of the input. Considering the proportional gain means that increase or decrease of the output of the tracking controller depends on a size of the input.

Figure 4:
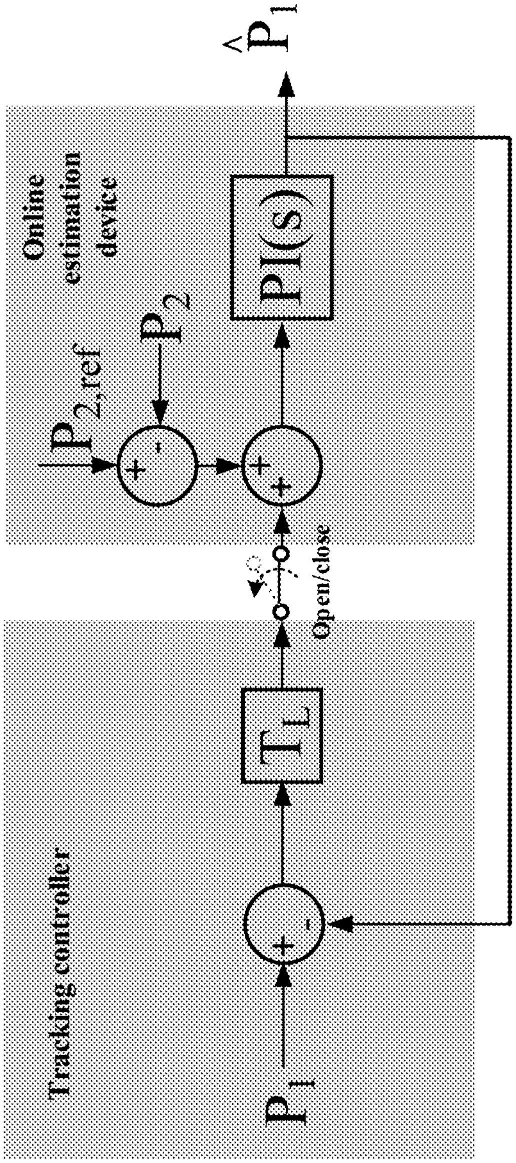
FIG. 4 is a control block diagram of a process for estimating an online estimate value of a first chamber pressure of a hydraulic actuator online according to some embodiments of the present disclosure.

In conjunction with FIG. 4, $p_1$ denotes the first chamber pressure, $p_2$ denotes the second chamber pressure, $p_{2,ref}$ denotes the preset target reference pressure, $p_1$ denotes the online estimate value of the first chamber pressure, and PI(s) denotes performing the proportional control and the integral control on the input. The processor may sum the difference between $p_{2,ref}$ and $p_2$ and the output of the tracking controller, perform the proportional control and the integral control on the a result of the sum as the input of the tracking controller, and obtain, by inputting the input and the first chamber pressure into the tracking controller, the online estimate value $p_1$ through the equation (2).

In S3, an opening signal of the independent metering valve 1 controlled by the explicit controller may be obtained based on the first chamber pressure, and an opening signal of the independent metering valve 1 controlled by the implicit controller may be obtained based on the online estimate value of the first chamber pressure.

The opening signal refers to an electrical signal related to a degree of opening of a valve spool. The larger the amplitude of the opening signal is, the greater the degree of opening of the valve spool may be.

In some embodiments, the independent metering valve 1 controlled by the explicit controller may adopt a flow control loop. The processor (e.g., a valve controller module) may obtain, according to a reference velocity of the hydraulic actuator and a differential pressure, the opening signal of the independent metering valve 1 controlled by the explicit controller. The independent metering valve adopting a flow control loop means that a desired system flow is obtained by adjusting the opening signal of the valve.

For example, when the independent metering valve 1 controlled by the explicit controller adopts the flow control loop, the processor (e.g., the valve controller module) may determine the opening signal $u_1$ of the independent metering valve 1 controlled by the explicit controller according to the following equation (3):

$$u_1 = u^{-1}(v_{ref} A_1, p_s - p_1) \quad (3),$$

where $v_{ref}$ denotes the reference velocity of the hydraulic actuator, $A_1$ denotes an area of a rodless chamber of the hydraulic actuator, $p_s$ denotes a pressure of the electro-hydraulic system, $p_1$ denotes the first chamber pressure, $u^{-1}$ $(q_{ref}, \Delta p_1)$ denotes a valve opening calibrated in advance using a reference flow $q_{ref}$ and a differential pressure $\Delta p_1$, $q_{ref}$ denotes a product of the reference velocity $v_{ref}$ and the area $A_1$ of the rodless chamber, and $\Delta p_1$ denotes a difference between the pressure $p_s$ of the electro-hydraulic system and the first chamber pressure $p_1$. The pressure of the electro-hydraulic system may be obtained and monitored based on the system pressure sensor. The area of the rodless chamber refers to an area of a chamber in the hydraulic actuator that does not include the piston rod.

It should be noted that, in the embodiment of the present disclosure, function curves of the valve opening and the flow under different $\Delta p_1$ may be obtained by fitting through a Curve Fitting toolbox of MATLAB software in advance. On the basis of the fitting function curve, the opening signal of the independent metering valve 1 controlled by the explicit controller may be calculated after the differential pressure and reference flow are obtained. At this time, the independent metering valve 1 in the implicit controller may also adopt flow control. According to the reference velocity and differential pressure, the opening signal of the independent metering valve 1 controlled by the implicit controller may also be obtained.

In some embodiments, the independent metering valve 1 controlled by the implicit controller may adopt the flow control loop. The processor (e.g., the valve controller module) may obtain the opening signal of the independent metering valve 1 controlled by the implicit controller according to the reference velocity and the differential pressure.

For example, when the independent metering valve 1 controlled by the implicit controller adopts the flow control loop, the processor (e.g., the valve controller module) may determine the opening signal $u_1'$ of the independent metering valve 1 controlled by the implicit controller according to the following equation (4):

$$u_1' = u^{-1}(v_{ref}A_1, p_s - \hat{p}_1) \quad (4),$$

where $\hat{p}_1$ denotes the online estimate value of the first chamber pressure, $u^{-1}$ $(q_{ref}, \Delta p_1)$ denotes a valve opening calibrated in advance using the reference flow Gref and the differential pressure $\Delta p_1'$, and $\Delta p_1'$ denotes a difference between the pressure $p_s$ of the electro-hydraulic system and the online estimate value $\hat{p}_1$.

As mentioned above, the function curves of the valve opening and the flow under different $\Delta p_1'$ may be obtained in advance by fitting through the Curve Fitting toolbox of MATLAB software.

In S4, an opening signal of the independent metering valve 2 controlled by the explicit controller using a pressure control loop may be obtained based on the second chamber pressure, and an opening signal of the independent metering valve 2 controlled by the implicit controller may be obtained based on a reference velocity of the hydraulic actuator using a flow control loop.

In some embodiments, when the independent metering valve 2 controlled by the explicit controller may adopt the pressure control loop, and the processor (e.g., the valve controller module) may determine the opening signal of the independent metering valve 2 controlled by the explicit controller according to the second chamber pressure and the target reference pressure. The independent metering valve adopting the pressure control loop means that a desired pressure is obtained by adjusting the opening signal of the control valve. In some embodiments, when the independent metering valve 2 controlled by the explicit controller adopts the pressure control loop, the processor (e.g., the valve controller module) may determine the opening signal $u_2$ of the independent metering valve 2 controlled by the explicit controller according to the following equation (5):

$$u_2 = K_p \cdot (p_2 - p_{2,ref}) + K_i \int_t^{t_i} (p_2 - p_{2,ref}) dt, \quad (5)$$

where $p_2$ denotes the second chamber pressure, $p_{2,ref}$ denotes the preset target reference pressure, t denotes an integration starting time, and $t_i$ denotes an integration termination time.

In some embodiments, when the independent metering valve 2 controlled by the implicit controller may adopt the flow control loop, the processor (e.g., the valve controller module) may determine an opening signal of the independent metering valve 2 controlled by the implicit controller according to the reference velocity and the differential pressure of the hydraulic actuator.

In some embodiments, when the independent metering valve 2 controlled by the implicit controller adopts the flow control loop, the processor (e.g., the valve controller module) may determine the opening signal $u_2'$ of the independent metering valve 2 controlled by the implicit controller according to the following equation (6):

$$u_2' = u^{-1}(v_{ref}A_2, p_2 - p_r) \quad (6),$$

where $A_2$ denotes an area of a rod chamber of the hydraulic actuator, $p_r$ denotes a return oil pressure, $u^{-1}$ $(q_{ref}; \Delta p_2)$ denotes a valve opening calibrated in advance using a reference flow $q_{ref}'$ and a differential pressure $\Delta p_2$, $q_{ref}'$ denotes a product of the reference velocity $v_{ref}$ and the area $A_2$ of the rod chamber, and $\Delta p_2$ denotes a difference between the second chamber pressure $p_2$ and the return oil pressure $p_r$. The area of the rod chamber refers an area of a chamber in the hydraulic actuator that includes the piston rod. The return oil pressure may be obtained based on a return oil pressure sensor.

In S5, a first residual of the independent metering valve 1 may be determined by performing subtraction on the opening signal of the independent metering valve 1 controlled by the implicit controller and the opening signal of the independent metering valve 1 controlled by the explicit controller, and a second residual of the independent metering valve 2 may be determined by performing subtraction on the opening signal of the independent metering valve 2 controlled by the implicit controller and the opening signal of the independent metering valve 2 controlled by the explicit controller.

In some embodiments, the processor may calculate the first residual $r_{u_1}$ of the independent metering valve 1 and the second residual $r_{u_2}$ of the independent metering valve 2 according to the following equations (7) and (8):

$$r_{u_1} = u_1 - u_1' \quad (7), \text{ and}$$

$$r_{u_2} = u_2 - u_2' \quad (8)$$

where $u_1$ denotes the opening signal of the independent metering valve 1 controlled by the explicit controller, $u_1'$ denotes the opening signal of the independent metering valve 1 controlled by the implicit controller, $u_2$ denotes the opening signal of the independent metering valve 2 controlled by the explicit controller, and $u_2'$ denotes the opening signal of the independent metering valve 2 controlled by the implicit controller.

It should be noted that the opening signal determined by the explicit controller is an actual opening signal of the valve, and the explicit controller may participate in the actual control of the independent metering valve. However, the implicit controller may be designed to participate in the calculation only, and a calculation result of the implicit controller may be used as a basis for performing fault diagnosis of two-chamber pressure sensor of the hydraulic actuator.

In S6, whether the independent metering valve 1 and the independent metering valve 2 are faulty may be identified by comparing the first residual and the second residual respectively with preset thresholds corresponding to the first residual and the second residual.

The preset threshold may correspond to a preset threshold condition for determining whether the independent metering valve 1 and the independent metering valve 2 are faulty. The independent metering valve 1 and the independent metering valve 2 being faulty means the first chamber pressure sensor and the second chamber pressure sensor of the hydraulic actuator being faulty, respectively instead of the independent metering valve 1 or the independent metering valve 2 being faulty.

The preset threshold may be set by the system or artificially. In some embodiments, the preset threshold corresponding to the first residual may be the same as or different from the preset threshold corresponding to the second residual.

In some embodiments, the preset threshold may be a preset numeric value. In some embodiments, the preset threshold may be a preset interval. An upper interval value and a lower interval value of the preset threshold may be preset by the system or artificially. When the first residual or the second residual is not in the interval corresponding to the preset threshold, the processor may determine that the first residual or the second residual exceeds the preset threshold.

In some embodiments, the processor may determine whether the first residual exceeds the preset threshold corresponding to the first residual, in response to a determination that the first residual does not exceed the preset threshold corresponding to the first residual, determine whether the second residual exceeds the preset threshold corresponding to the second residual, in response to a determination that the second residual exceeds the preset threshold corresponding to the second residual, determine that a signal is abnormal, or in response to a determination that the second residual does not exceed the preset threshold corresponding to the second residual, determine that the first chamber pressure sensor of the hydraulic actuator and the second chamber pressure sensor of the hydraulic actuator are fault free.

Figure 5:
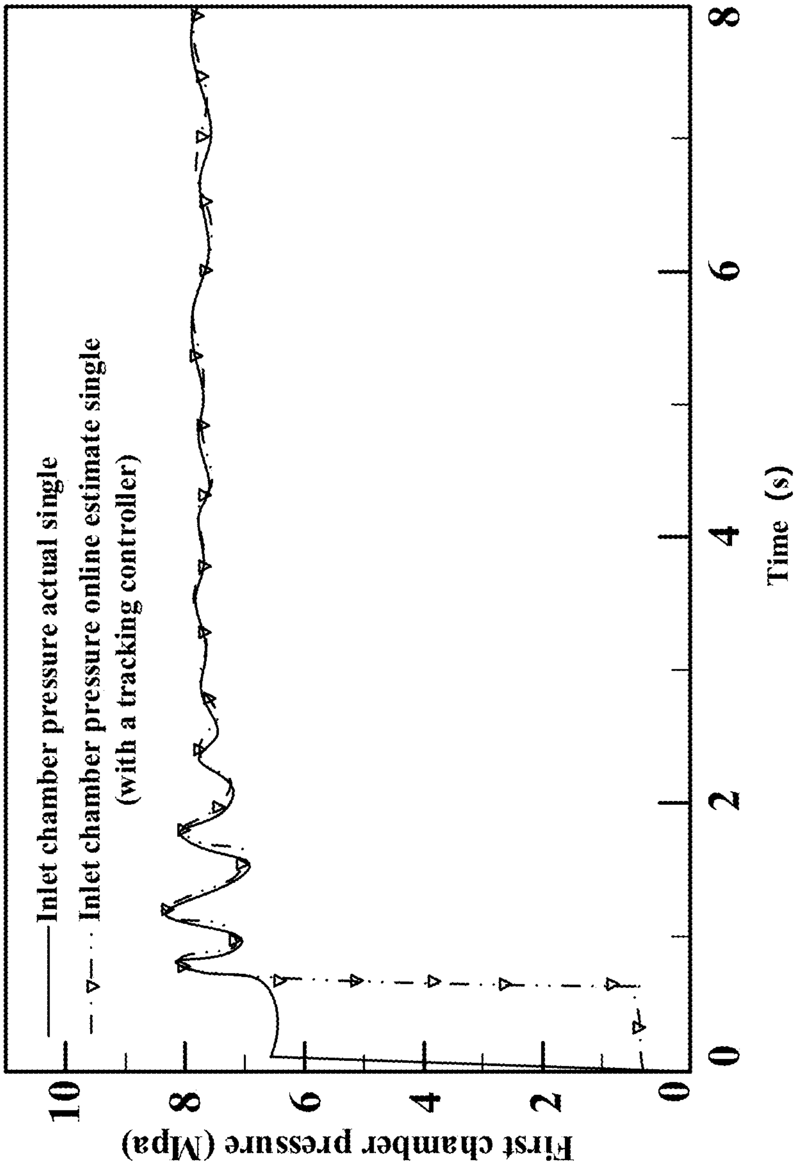
FIG. 5 is a diagram of variation curves of an online estimate value of a first chamber pressure of a hydraulic actuator and a detection value of a first chamber pressure of a hydraulic actuator according to some embodiments of the present disclosure.

As shown in FIG. 5, FIG. 5 is a diagram of variation curves of an online estimate value of a first chamber pressure of a hydraulic actuator and a detection value of a first chamber pressure of a hydraulic actuator according to some embodiments of the present disclosure. The abscissa is time and the ordinate is the first chamber pressure.

With reference to FIG. 1, the first chamber pressure of the hydraulic actuator and the second chamber pressure of the hydraulic actuator may need to be used to determine the online estimate value of the first chamber pressure of the hydraulic actuator. Therefore, with reference to FIG. 5, when the electro-hydraulic system operates normally, the online estimate value of the first chamber pressure of the hydraulic actuator may accurately reflect the first chamber pressure of the hydraulic actuator, and the first residual $r_{u_1}$ between the opening signal of the independent metering valve 1 controlled by the explicit controller and the opening signal of the independent metering valve 1 controlled by the implicit controller may be approximated to be zero, and the first residual $r_{u_1}$ may be always smaller than the preset threshold corresponding to the first residual $r_{u_1}$.

When the first chamber pressure sensor of the hydraulic actuator or the second chamber pressure sensor of the hydraulic actuator is faulty, the online estimate value of the first chamber pressure of the hydraulic actuator may become abnormal, which may result in a relatively large deviation of the opening signal of the independent metering valve 1 controlled by the explicit controller and the opening signal of the independent metering valve 1 controlled by the implicit controller, and a fact that the first residual exceeds the preset threshold corresponding to the first residual. However, in this case, it may be still impossible to determine whether the first chamber pressure sensor of the hydraulic actuator is faulty or the second chamber pressure sensor of the hydraulic actuator is faulty.

Therefore, when the first residual exceeds the preset threshold corresponding to the first residual, the processor may need to further determine whether the second residual exceeds the preset threshold corresponding to the second residual.

According to some embodiments of the present disclosure, when the first residual does not exceed the corresponding preset threshold, by comparing the second residual with the corresponding preset threshold, it is possible to quickly and accurately determine whether or not the first chamber pressure sensor, the second chamber pressure sensor is faulty and whether the signal is abnormal, the judgment method is simple and efficient, and the efficiency of fault diagnosis is improved.

In some embodiments, the processor may also determine that there is an abnormality in the pressure sensor when the first residual is determined to exceed the preset threshold corresponding to the first residual.

In some embodiments, in response to a determination that the first residual exceeds the preset threshold corresponding to the first residual, the processor may determine whether the second residual exceeds the preset threshold corresponding to the second residual, in response to a determination that the second residual exceeds the preset threshold corresponding to the second residual, determine at least second chamber pressure sensor of the hydraulic actuator is faulty, or in response to a determination that the second residual does not exceed the preset threshold corresponding to the second residual, determine the first chamber pressure sensor of the hydraulic actuator is faulty.

Figure 6:
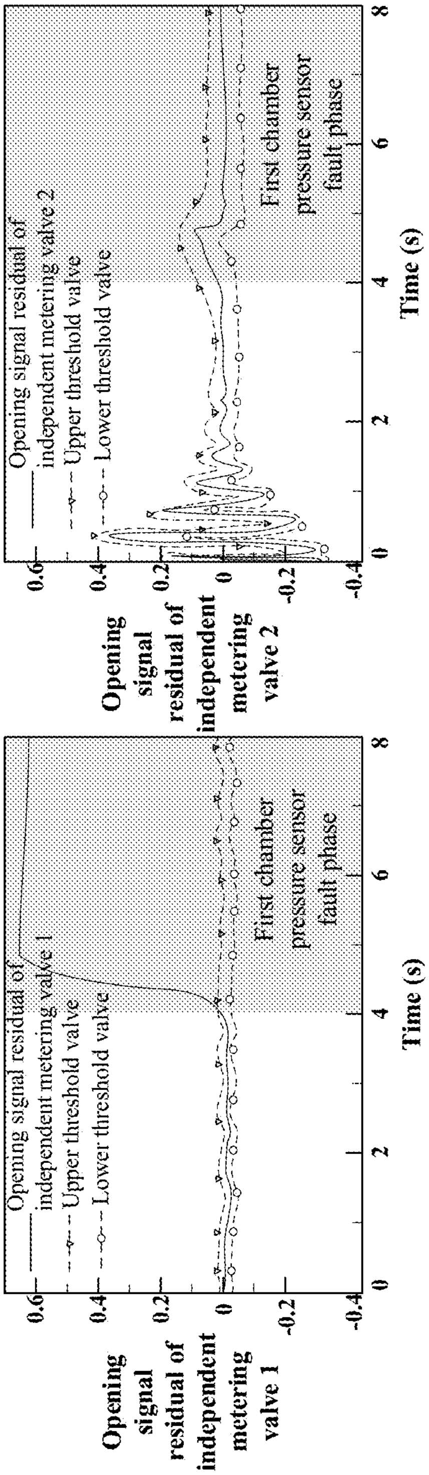
FIG. 6 is a diagram of a variation curve of a residual signal after a first chamber pressure sensor of a hydraulic actuator is faulty according to some embodiments of the present disclosure.

It should be noted that in the case where the first chamber pressure sensor is faulty and the second chamber pressure sensor is fault free, the opening signals of the explicit and implicit controllers of the independent metering valve 2 are not affected, and the second residual does not exceed a range of the preset threshold corresponding to the second residual. As a result, when the first chamber pressure sensor of the hydraulic actuator is faulty and the second chamber pressure sensor of the hydraulic actuator are fault free, the first residual may exceed the preset threshold corresponding to the first residual. The failure of the first chamber pressure sensor of the hydraulic actuator may not affect a control strategy of the independent metering valve 2, and the second residual may not exceed the preset threshold corresponding to the second residual. That is, when the first residual exceeds the preset threshold corresponding to the first residual, and the second residual does not exceed the preset threshold corresponding to the second residual, it means that the first chamber pressure sensor of the hydraulic actuator is faulty and the second chamber pressure sensor of the hydraulic actuator is fault free. After the first chamber pressure sensor 3 of the hydraulic actuator is faulty, the variation curve of the residual signal is shown in FIG. 6.

Figure 7:
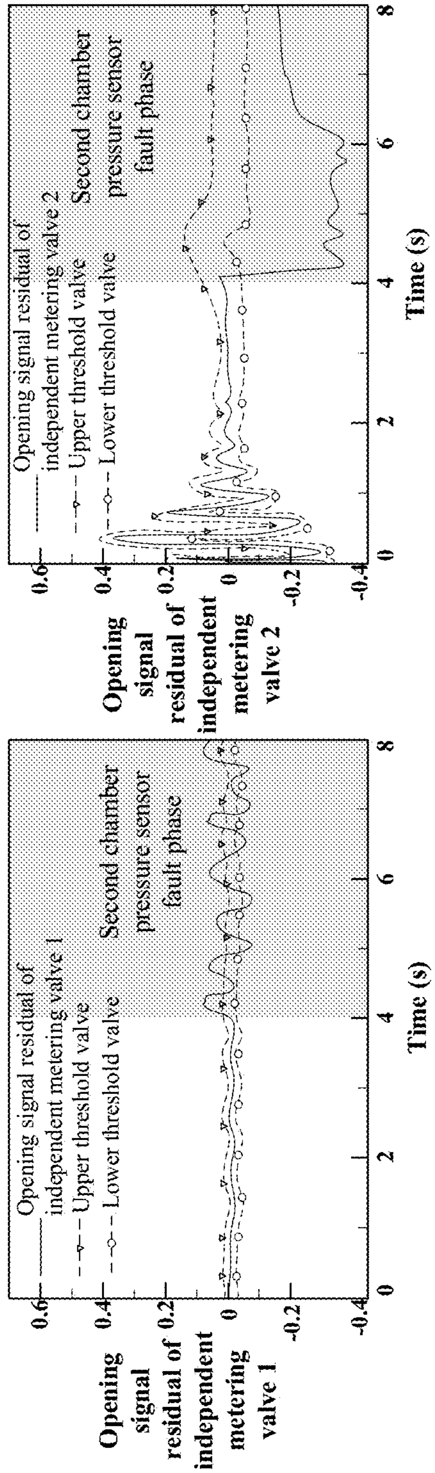
FIG. 7 is a diagram of a variation curve of a residual signal after a second chamber pressure sensor of a hydraulic actuator is faulty according to some embodiments of the present disclosure.

In addition, in the case where the at least second chamber pressure sensor of the hydraulic actuator is faulty, the online estimate value of the first chamber pressure of the hydraulic actuator may become abnormal, which may result in a relatively large deviation between the opening signal of the independent metering valve 1 controlled by the explicit controller and the opening signal of the independent metering valve 1 controlled by the implicit controller, and the first residual may exceed the preset threshold corresponding to the first residual. At this time, since the second chamber pressure sensor of the hydraulic actuator is faulty, the second residual may also exceed the preset threshold corresponding to the second residual. Therefore, when the second chamber pressure sensor of the hydraulic actuator is faulty, or both the first chamber pressure sensor of the hydraulic actuator and the second chamber pressure sensor of the hydraulic actuator are faulty, the first residual and the second residual may both exceed the preset thresholds corresponding to the first residual and the second residual. After the second chamber pressure sensor of the hydraulic actuator is faulty, the variation curve of the residual signal is shown in FIG. 7.

According to some embodiments of the present disclosure, whether the first residual exceeds the preset threshold corresponding to the preset threshold may be determined, and the second residual may be compared with the preset threshold after the first residual exceeds the preset threshold corresponding to the first residual, so that a pressure sensor that is faulty may be accurately determined, which helps to improve the accuracy and efficiency of fault diagnosis.

Figure 3:
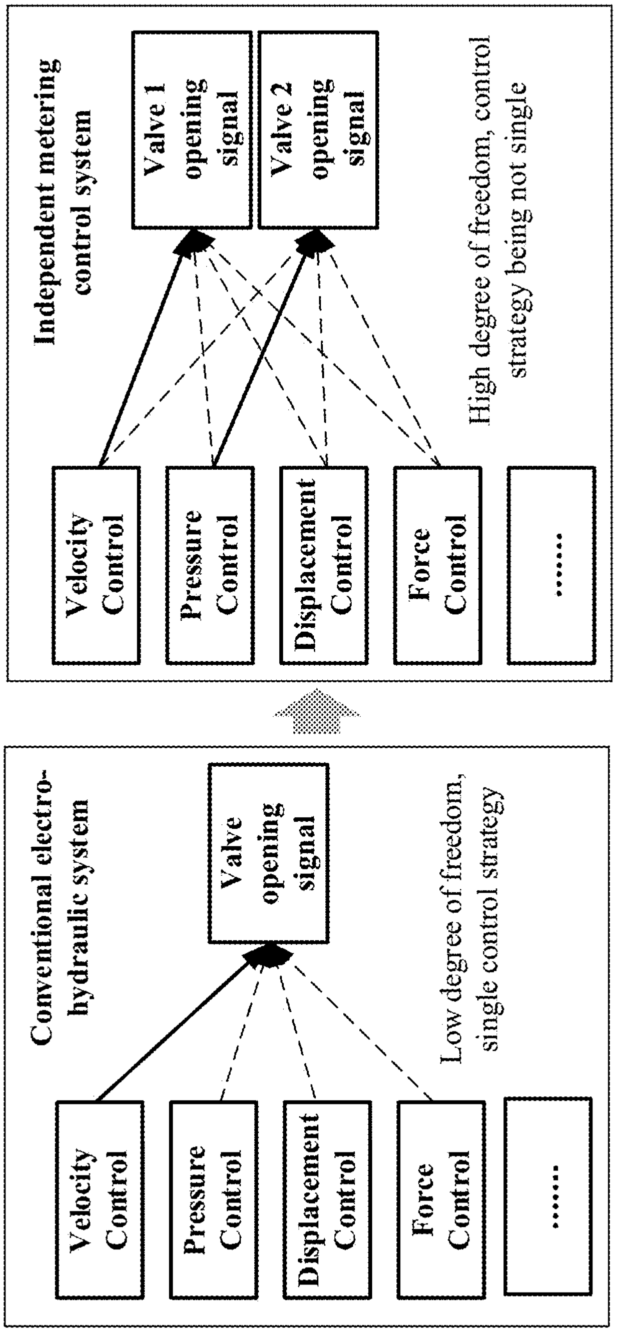
FIG. 3 is a theoretical explanation diagram of coexistence of an explicit controller and an implicit controller according to some embodiments of the present disclosure.

FIG. 3 is a theoretical explanation diagram of coexistence of an explicit controller and an implicit controller according to some embodiments of the present disclosure.

Referring to FIG. 3, in a conventional electro-hydraulic system, due to the low degree of freedom of control of the electro-hydraulic system and the single control objective, only one control strategy may be selected to control of the opening signal of the valve. The control strategy refers to a relevant strategy for controlling the opening signal of the valve of the electro-hydraulic system. For example, the control strategy may include velocity control, pressure control, displacement control, force control, etc.

Referring to FIG. 3, in an independent metering control system, a plurality of valves may be used for joint control, which has a high degree of freedom and may meet the diversity of system requirements. For example, the processor may control the opening signal of the independent metering valve 1 through velocity control and the opening signal of the independent metering valve 2 by pressure control. In this context, in the explicit controller, an optimal control strategy may be selected in the actual working process to satisfy a plurality of control objectives. In addition, due to the high degree of freedom of control of the independent metering control system, the control strategy may not be a single mode, which may also provide a theoretical basis for design of the implicit controller. Therefore, the implicit controller may participate in the hidden calculation instead of participating in the actual control process, which may serve as a basis of fault diagnosis. Therefore, the method may design the implicit controller by exploring system analytical redundancy instead of needing to add additional hardware, and perform fault diagnosis on the two-chamber pressure sensor of the hydraulic actuator through the residual between the valve opening signals obtained by the explicit and implicit dual controllers.

In some embodiments, the processor may determine a flow adjustment amount based on a relationship between the first residual and the preset threshold corresponding to the first residual and a relationship between the second residual and the preset threshold corresponding to the second residual, and generate, based on the flow adjustment amount, a power source adjustment instruction and/or an opening adjustment instruction of the valve.

In some embodiments, the relationship between the first residual and the preset threshold corresponding to the first residual may include a magnitude by which the first residual exceeds the preset threshold corresponding to the first residual. The relationship between the second residual and the preset threshold corresponding to the second residual may include a magnitude by which the second residual exceeds the preset threshold corresponding to the second residual.

In some embodiments, the processor may determine, based on a ratio of a difference of the first residual exceeding the preset threshold corresponding to the first residual to the first residual, the magnitude by which the first residual exceeds the preset threshold corresponding to the first residual, and determine, based on a ratio of a difference of the second residual exceeding the preset threshold corresponding to the second residual, the magnitude by which the second residual exceeds the preset threshold corresponding to the second residual.

The flow adjustment amount refers to an amount by which the flow of the power source is adjusted. More descriptions regarding the power source may be found in the relevant descriptions in FIG. 1.

In some embodiments, the processor may determine the flow adjustment amount in various ways based on the relationship between the first residual and the preset threshold corresponding to the first residual and the relationship between the second residual and the preset threshold corresponding to the second residual. Exemplarily, the greater the magnitude by which the first residual and/or the second residual exceeds the preset threshold corresponding to the first residual and/or the second residual is, the greater the flow adjustment amount may be. For example, the processor may determine the flow adjustment amount based on the following equation: flow adjustment amount=magnitude by which the residual exceed the preset threshold * current flow. The current flow refers to a current flow of the power source, which may be obtained based on a flow meter. The magnitude by which the residual exceeds the preset threshold may include a maximum value or an average value of the magnitude by which the first residual exceeds the preset threshold corresponding to the first residual and the magnitude by which the second residual exceeds the preset threshold corresponding to the second residual, etc.

The power source adjustment instruction refers to an instruction configured to adjust the flow of the power source. In some embodiments, the power source adjustment instruction may be configured to instruct the power source to operate at an adjusted flow.

The opening adjustment instruction refers to an instruction configured to adjust a degree of valve spool opening. In some embodiments, the opening adjustment instruction may be configured to instruct the independent metering valve 1 and/or the independent metering valve 2 to adjust a magnitude of opening thereof.

In some embodiments, the processor may generate, based on the flow adjustment amount, at least one of the power source adjustment instruction and the opening adjustment instruction. In some embodiments, the processor may determine a type of adjustment instruction to be generated, and generate, based on the flow adjustment amount, the power source adjustment instruction and/or the opening adjustment instruction.

In some embodiments, the processor may determine the type of adjustment instruction to be generated based on a user input. The type of adjustment instruction may include the power source adjustment instruction and the opening adjustment instruction. The user may determine an adjustment priority of the flow of the power source and valve opening according to a type of the power source. For example, when the power source is a constant-pressure variable pump, the user may determine that the priority of the valve opening adjustment is higher than the priority of the power source flow adjustment. If the user input is generating the opening adjustment instruction, the processor may determine that the type of the generated adjustment instruction is the opening adjustment instruction.

In some embodiments, the processor may determine whether to generate the power source adjustment instruction and/or the opening adjustment instruction of the valve through a first preset rule.

The first preset rule refers to a computer rule or algorithm configured to determine treatment measures taken for the electro-hydraulic system in different fault situations that is set in advance. For example, the first preset rule may include that when the first residual does not exceed the preset threshold corresponding to the first residual and the second residual exceeds the preset threshold corresponding to the second residual, no treatment measure is taken; when the first residual exceeds the preset threshold corresponding to the first residual, and the second residual exceeds the preset threshold corresponding to the second residual, the electro-hydraulic system is shut down for maintenance; or when the first residual exceeds the preset threshold corresponding to the first residual and the second residual does not exceed the preset threshold corresponding to the second residual, the electro-hydraulic system is shut down for maintenance.

In some embodiments, the first preset rule may include that the user is reminded of a signal abnormality and the power source adjustment instruction and the opening adjustment instruction are not generated when the first residual does not exceed the preset threshold corresponding to the first residual and the second residual exceeds the preset threshold corresponding to the second residual;

In some embodiments, the first preset rule may include that when the first residual does not exceed the preset threshold corresponding to the first residual and the second residual does not exceed the preset threshold corresponding to the second residual, the power source adjustment instruction and the opening adjustment instruction are not generated.

In some embodiments, the first preset rule may include that when the first residual exceeds the preset threshold corresponding to the first residual and the second residual exceeds the preset threshold corresponding to the second residual, the user is reminded of the fault and the power source adjustment instruction and/or the opening adjustment instruction are generated.

In some embodiments, the first preset rule may include when the first residual exceeds the preset threshold corresponding to the first residual and the second residual does not exceed the preset threshold corresponding to the second residual, the user is reminded of the fault and the power source adjustment instruction and/or the opening adjustment instruction are generated.

It should be noted that for the independent metering valve 1, both the power source adjustment instruction and/or the opening adjustment instruction may achieve the flow control. For example, the flow of the independent metering valve 1 may be adjusted by adjusting the opening of the independent metering valve 1 only through the opening adjustment instruction. The flow of the power source may be adjusted by adjusting the flow of the power source only through the power source adjustment instruction. The flow of the independent metering valve 1 may also be adjusted comprehensively simultaneously through the opening adjustment instruction and the power source adjustment instruction. For the independent metering valve 2, the flow of the independent metering valve 2 may be adjusted only through the opening adjustment instruction.

In some embodiments, the processor may determine, based on the flow adjustment amount and the current flow, the flow after the power source is adjusted, and generate the power source adjustment instruction and/or the opening adjustment instruction in various ways. For example, the processor may determine the adjusted flow based on the flow adjustment amount by the following equation: adjusted flow=current flow+flow adjustment amount. As another example, the processor may determine valve openings corresponding to different adjusted flows based on historical data. The processor may determine, based on historical data, a correspondence between the different adjusted flows and the different valve openings, determine, based on the flow adjustment amount, an actual adjusted flow, and determine, based on the actual adjusted flow and the correspondence, the valve opening corresponding to the actual adjusted flow.

In some embodiments, when the first residual exceeds the preset threshold corresponding to the first residual and the second residual exceeds the preset threshold corresponding to the second residual, the processor may update, based on a second preset rule, the flow adjustment amount, and generate, based on the updated flow adjustment amount, the power source adjustment instruction and/or the opening adjustment instruction.

The second preset rule refers to a rule configured to update the flow adjustment amount that is set in advance. The exemplary second preset rule may be: adjusting the flow adjustment amount based on a preset ratio. The preset ratio may be a constant greater than 1, which may be set by the system or artificially.

When the first residual exceeds the preset threshold corresponding to the first residual and the second residual exceeds the preset threshold corresponding to the second residual, the reliability of the electro-hydraulic system may be the lowest. In some embodiments of the present disclosure, the flow may be reduced greatly by adjusting the flow adjustment amount in this case so as to increase system safety.

In some embodiments, the processor may send the opening adjustment instruction including the valve opening corresponding to the adjusted flow to the corresponding valve so as to control the opening of the corresponding valve to be adjusted to the valve opening corresponding to the opening adjustment instruction.

According to some embodiments of the present disclosure, the power source adjustment instruction and/or the opening adjustment instruction may be generated based on the flow adjustment amount, so that the flow may be reduced in time when the electro-hydraulic system is faulty, thereby ensuring the safe operation of the electro-hydraulic system.

In some embodiments, the processor may adjust the preset threshold based on misjudgment data in the historical data. In some embodiments, the processor may adjust the preset thresholds corresponding to the first residual and the second residual, respectively, based on the misjudgment data in the historical data.

The misjudgment data refers to data that deviates from an actual diagnosis result. The deviation means that the fault diagnosis result determined based on the method is not consistent with the actual diagnosis result. For example, the misjudgment data may include that the result determined based on the method is faulty and the actual diagnosis result is fault free (i.e., a first type of misjudgment data), and the result determined based on the method is fault free and the actual diagnosis is faulty (i.e., a second type of misjudgment data). The misjudgment data may be obtained based on the historical data.

In some embodiments, the processor may adjust the preset threshold based on a third preset rule according to the misjudgment data in the historical data. It should be noted that the adjusted preset threshold is a preset threshold corresponding to the valve where the misjudgment occurs. For example, if the processor accurately determines the fault of the independent metering valve 1, and misjudges the fault of the independent metering valve 2, only the preset threshold corresponding to the independent metering valve 2 may need to be adjusted.

The third preset rule refers to a rule configured to adjust the preset threshold that is set in advance. In some embodiments, the third predetermined rule may include that increasing the preset threshold in response to a determination that the misjudgment data is the first type of misjudgment data, or decreasing the preset threshold in response to a determination that the misjudgment data is the second type of misjudgment data. The processor may determine the adjusted preset threshold based on the following equation: increased preset threshold=original preset threshold+e * original preset threshold; and decreased preset threshold=original preset threshold value−f * original preset threshold, where e and f are empirical values. For example, values of e and f may in a range of 0~0.5.

If the misjudgment data is that when the result is fault free and the actual diagnosis is faulty, the preset threshold may be too broad. Therefore, a value range of f may be greater than a value range of e to accurately identify the fault.

In some embodiments, the preset threshold may also be related to operating condition data of the electro-hydraulic system.

The operating condition data refers to data related to an operating condition of the electro-hydraulic system. For example, the operating condition data may include first vibration data, ambient temperature, ambient pressure, ambient humidity, etc.

The first vibration data refers to data related to vibration of the electro-hydraulic system. For example, the first vibration data may include a vibration period, an amplitude, etc. of the electro-hydraulic system.

In some embodiments, the processor may obtain the operating condition data of the electro-hydraulic system based on various feasible monitoring devices. For example, the processor may obtain, based on a vibration sensor disposed in the electro-hydraulic system, the first vibration data, obtain, based on a temperature sensor disposed in the electro-hydraulic system, the ambient temperature, obtain, based on a pressure sensor disposed in an operating environment of the electro-hydraulic system, the ambient pressure, and obtain, based on a humidity sensor disposed in the electro-hydraulic system, the ambient humidity. The processor may also obtain, based on an user input, etc., the ambient temperature, the ambient pressure, the ambient humidity, etc.

In some embodiments, the processor may determine, based on the operating condition data, a degree of harshness of the operating condition, and determine, based on the degree of harshness of the operating condition, an adjustment value of the preset threshold. The adjustment value of the preset threshold may be negatively correlated with the degree of harshness of the operating condition. For example, the higher the degree of harshness of the operating condition is, the smaller the adjustment value of the corresponding preset threshold may be.

The degree of harshness of the operating condition (also referred to as operating-condition harshness degree) refers to a degree of harshness of the operating condition. In the operating condition data, the larger the amplitude in the first vibration data is, the higher the ambient temperature is, the larger the ambient pressure is, and the larger the ambient humidity is, the larger the degree of harshness of the corresponding operating condition may be.

In some embodiments, the processor may determine, based on the operating condition data, the degree of harshness of the operating condition through a fourth preset rule. The fourth preset rule refers to a computer rule or algorithm configured to determine the degree of harshness of the operating condition that is set in advance. The exemplary fourth preset rule may include determining a weighted summation result of the normalized amplitude, the ambient temperature, the ambient pressure, and the ambient humidity in the first vibration data as the degree of harshness of the operating condition.

In some embodiments, the preset threshold may also be related to interference data of an operating scenario.

The interference data refers to data related to interference with fault diagnosis caused by a factor other than the electro-hydraulic system in the operating scenario. For example, the interference data may include second vibration data, electrical interference data, etc.

The second vibration data refers to data related to vibration of a device in which the electro-hydraulic system is disposed. For example, if the electro-hydraulic system is disposed on an excavator, the second vibration data may include a vibration period, an amplitude, etc. of the excavator.

The electrical interference data refers to data such as power fluctuation and electromagnetic interference in the operating scenario.

In some embodiments, the processor may obtain the interference data in various ways. For example, the processor may obtain, based on a vibration sensor deployed in a device provided with the electro-hydraulic system, the second vibration data, and obtain, based on electrical data (e.g., a power supply voltage of a power supply in the operating scenario, etc.), the electrical interference data.

In some embodiments, the processor may determine whether there is interference based on the interference data of the operating scenario. When it is determined that there is interference, the processor may further reduce the preset threshold based on the preset threshold determined based on the operating condition data of the electro-hydraulic system.

In some embodiments, the processor may analyze an interference amplitude corresponding to the interference data through various feasible means (e.g., spectrum analysis technology). When the interference amplitude is greater than an amplitude threshold, the interference data may be determined to interfere with the fault diagnosis. The amplitude threshold may be preset by the system or artificially. The exemplary spectrum analysis technology may include an algorithm such as Fourier transform.

It should be noted that the processor may determine whether the interference data interferes with the fault diagnosis based on the second vibration data or the electrical interference data alone, or the processor may comprehensively determine whether the interference data interferes with the fault diagnosis by combining the second vibration data and the electrical interference data. When determining comprehensively, the processor may determine the weighted summation result of the interference amplitude corresponding to the second vibration data and the interference amplitude corresponding to the electrical interference data as an interference amplitude compared with the amplitude threshold.

In some embodiments, the processor may determine a reduction of the preset threshold based on a difference between the interference amplitude and the amplitude threshold. Exemplarily, the greater the difference between the interference amplitude and the amplitude threshold is, the greater the reduction of the preset threshold may be. The correspondence between the interference amplitude and the amplitude threshold may be obtained based on experiments, historical data, etc.

According to some embodiments of the present disclosure, the preset threshold may be determined based on the operating condition data, so that the preset threshold may be more consistent with the current operating scenario, thereby improving the accuracy of the fault diagnosis. The preset threshold may be determined based on the interference data of the operating scenario, so that the preset threshold may be more consistent with the current operating scenario, thereby improving the accuracy of the fault diagnosis.

In some embodiments, after the preset threshold is adjusted, the preset threshold corresponding to the independent metering valve 1 may be smaller than the preset threshold corresponding to the independent metering valve 2.

The independent metering valve 1 may be closer to the power source. The determining whether the independent metering valve 1 is faulty may be more important than the determining whether the independent metering valve 2 is faulty. According to some embodiments of the present disclosure, the preset threshold corresponding to the independent metering valve 1 may be controlled smaller than the preset threshold corresponding to the independent metering valve 2, which makes the determination performed on the independent metering valve 1 more demanding, and further improves the accuracy of the fault diagnosis on the basis of improving the flexibility of the method.

According to some embodiments of the present disclosure, the corresponding preset threshold may be adjusted based on the misjudgment data, which helps the subsequent fault diagnosis process identify the fault more accurately, thereby improving the accuracy of the fault diagnosis.

In some embodiments, the processor may determine, based on the vibration data and the electrical interference data, a sequence of interference time points through an interference model, filter, based on the sequence of interference time points, pressure data at a plurality of consecutive time points acquired by the pressure sensor, and determine, based on the filtered pressure data, the first residual and the second residual.

The vibration data refers to data related to vibration of the electro-hydraulic system and a device provided with the electro-hydraulic system. In some embodiments, the vibration data may include the first vibration data and the second vibration data. More descriptions of the first vibration data and the second vibration data may be found above.

The interference model refers to a model configured to determine the sequence of interference time points. In some embodiments, the interference model may be a machine learning model, such as a recurrent neural network model, etc.

The sequence of interference time points refers to a sequence consisting of time points corresponding to pressure data that may be interfered.

In some embodiments, an input of the interference model may include the vibration data and the electrical interference data. An output of the interference model may include the sequence of interference time points.

In some embodiments, the processor may obtain, based on a large number of training samples with training labels, the interference model through training. For example, the processor may input a plurality of training samples with training labels into an initial interference model, construct a loss function through the training labels and prediction results of the initial interference model, and update the initial interference model based on iterations of the loss function. When the loss function of the initial interference model satisfies a preset iteration condition, the training of the interference model may be completed. The preset iteration condition may be that the loss function converges, a count of iterations reaches a set value, etc.

Each training sample may include sample vibration data and sample electrical interference data in a historical time period. The labels corresponding to the training samples may be whether the sample vibration data and the sample electrical interference data of a plurality of time points corresponding to the training samples interfere with the fault diagnosis. The training samples may be obtained based on the historical data. The training label may be a value of 0 or 1. 0 indicates that the sample vibration data and the sample electrical interference data in the historical time period do not interfere with the fault diagnosis, and 1 indicates that the sample vibration data and the sample electrical interference data in the historical time period interfere with the fault diagnosis. The processor may analyze an interference amplitude corresponding to the training sample through various feasible spectrum analysis technologies. When the interference amplitude is greater than the amplitude threshold, the training label corresponding to the training sample may be labeled as 1. When the interference amplitude is smaller than or equal to the amplitude threshold, the training label corresponding to the training sample may be labeled as 0. More descriptions of the amplitude threshold and the determining the interference amplitude may be found above.

In some embodiments, the processor may obtain, by performing statistics on a large amount of historical vibration data and historical electrical interference data, a statistical result, determine, based on the statistical result, different sets of training samples, and train the different sets of training samples alternately according to scale sizes. Different training sample sets may have different learning rates during the training process.

In some embodiments, the processor may statistically classify the plurality of training samples based on the vibration amplitudes of the sample vibration data, and the interference amplitudes of the sample electrical interference data in the training samples, and determine the different sets of training samples.

Exemplarily, the processor may perform a weighted summation on the vibration amplitudes of the sample vibration data and the interference amplitude of the sample electrical interference data at a same time point in the training samples, determine the amplitude statistical values corresponding to the training samples, sorting all the training samples according to sizes of the amplitude statistical values, and determine the different sets of training samples based on a fifth preset rule. The amplitude statistical values refer to statistical values of weighted results of the vibration amplitudes of the sample vibration data and the interference amplitudes of the sample electrical interference data in the training samples, for example, the amplitude statistical values corresponding to the training samples may include an average, a maximum, a variance, etc. of the weighted results within the training samples.

The fifth preset rule refers to a rule configured to determine the different sets of training samples that is set in advance. The exemplary fifth preset rule may include determining the sets of training samples by classifying, based on the sorting of the amplitude statistical values, according to the sizes of the amplitude statistical values. Each training sample set may need to include training samples of each category. For example, if the training samples are classified into three categories, each training sample set may need to include each category of the three categories of training samples. Proportions of the different categories of training samples in the training sample sets may be preset by the system or artificially.

For example, the fifth preset rule may include classifying the training samples into categories 1-5 based on the sorting of amplitude statistical values, and amplitude statistical values of the training samples of each category accounting for 20% of the total sorting, for example, category 1 is the training samples corresponding to the amplitude statistical values sorted in the top 20%, and category 2 is the training samples corresponding to amplitude statistical values sorted in the top 20%-40%. The processor may randomly determine different sets of training samples, and category 1:category 2:category 3:category 4:category 5=1:1:1:1:1 in the sets of training samples.

Additionally, a ratio of training samples with large amplitude statistical values to a training sample with low amplitude statistical value in the sets of training samples may need to be maintained at a certain numerical value. At the same time, a ratio of the sample vibration data to the sample electrical interference data in the sets of training samples may need to be maintained at a certain numerical value. The ratio may be preset by the system or artificially. For example, the ratio of the sample vibration data to the sample electrical interference data in the sets of training samples may be in a range of 1:9~9:1.

According to some embodiments of the present disclosure, each category of training samples may be included in each set of training samples, which may ensure sample diversity and improving the generalization ability of the model.

The scale size refers to a count of training samples in the set of training samples.

In some embodiments, the training the different sets of training samples alternately according to the scale sizes may include independently training the different sets of training samples of different scale sizes, respectively. More descriptions of the manner for independently training may be found above. When each set of training samples is independently trained, a corresponding loss function may be constructed respectively.

In some embodiments, learning rates of the different sets of training samples during training may be determined based on training sample features.

The training sample features refer to relevant features that reflect the features of the training sample. For example, the training sample features may include a time length of the training sample, a reliability of the training sample, etc.

The time length of the training sample refers to a length of a historical time period corresponding to the sample vibration data and the sample electrical interference data in the training sample. The larger the time length of the training sample is, the larger the corresponding learning rate may be.

The reliability of the training sample refers to a consistency rate of the training labels corresponding to the same samples or similar training samples. The higher the consistency rate of the training labels is, the higher the reliability of the training sample may be, the better the training effect may be, and the larger the corresponding learning rate may be. In some embodiments, the processor may take the consistency rate of the training labels of training samples of a same category as the consistency rate of the training labels of all training samples of the category. The processor may determine a maximum value between a ratio of training labels of 0 to the training samples of the category and a ratio of training labels of 1 to the training samples of the training samples of the category in the training labels of the training samples of the category as the consistency rate of the training labels of the training samples of the category.

According to some embodiments of the present disclosure, the processor may determine, based on the training sample features, the learning rates of different sets of training samples via a vector database.

In some embodiments, for any set of training samples, the processor may construct, based on a ratio of training samples of amplitude statistical values sorted in the top 50% to training samples of amplitude statistical values sorted in the bottom 50% corresponding to the sets of training samples, a ratio of a count of sets of training samples to a count of all sets of training samples, and the reliability of the training sample, a feature vector, match a reference vector in the vector database that satisfies a preset matching condition with the feature vector, and determine, based on a reference learning rate corresponding to the reference vector that satisfies the preset matching condition, the reference learning rate as the learning rate of the set of training samples. In some embodiments, the preset matching condition may include a vector distance being smaller than a distance threshold. The vector distance may include a Euclidean distance, a cosine distance, etc., and the distance threshold may be preset.

In some embodiments, the vector database may be constructed based on the historical data. In some embodiments, the vector database may include a plurality of reference vectors and a reference learning rate corresponding to each reference vector. The reference vector refers to a vector that is constructed based on a ratio of training samples of amplitude statistical values sorted in the top 50% to training samples of amplitude statistical values sorted in the bottom 50% corresponding to historical sets of training samples, a ratio of a count of sets of historical training samples to a count of all historical sets of training samples, and a reliability of the historical training sample. The reference learning rate may be an actual learning rate of the historical set of training samples corresponding to the reference vector. The reference learning rate may be a single numeric value or a sequence of learning rates constructed by learning rates of a plurality of training phases. The reference learning rate may be determined based on the historical data. For example, the processor may determine the learning rate of the historical set of training samples corresponding to the reference vector during a historical actual training process as the reference learning rate.

According to some embodiments of the present disclosure, the different sets of training samples may be trained according to the scale sizes alternately, and the learning rates of the different sets of training samples during the training process may be different, which may improve the training effect of the model, thereby improving the accuracy of an output of the mode.

In some embodiments, the processor may filter out pressure data corresponding to the interference time points.

In some embodiments, the processor may determine the first residual and the second residual based on the filtered pressure data through the method in FIG. 1. More descriptions may be found above.

According to some embodiments of the present disclosure, the first residual and the second residual may be determined based on the filtered pressure data, which may improve the accuracy of the determined first residual and the second residual, and facilitate performing subsequent fault diagnosis more accurately.

According to some embodiments of the present disclosure, the first residual and the second residual may be obtained by obtaining the valve opening signals of the explicit and implicit dual controller in the valve controller; whether the independent metering valve 1 and the independent metering valve 2 are faulty may be identified by comparing the first residual and the second residual respectively with the preset thresholds corresponding to the first residual and the second residual, the implicit controller may be designed by exploring the analytical redundancy of the independent metering control system, and the fault diagnosis may be performed on the two-chamber pressure sensor of the hydraulic actuator through the residual signal of the valve opening signals obtained by the explicit and implicit dual controller without the need to build a complex hydraulic model, so that the time and cost of troubleshooting may be reduced, a fault diagnosis response time is fast, and the faulty may be adjusted and repaired in time, thereby ensuring that the system works properly, improving the safety performance of the system, and reducing accidents.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for fault diagnosis of a pressure sensor of an electro-hydraulic system with an explicit controller and an implicit controller in parallel implemented by a processor, comprising:

receiving parameter information of the electro-hydraulic system, the parameter information including a first chamber pressure of a hydraulic actuator and a second chamber pressure of the hydraulic actuator;

obtaining, based on the first chamber pressure, an opening signal of an independent metering valve 1 controlled by the explicit controller; and obtaining, based on an online estimate value of the first chamber pressure, an opening signal of the independent metering valve 1 controlled by the implicit controller;

obtaining, based on the second chamber pressure, an opening signal of an independent metering valve 2 controlled by the explicit controller using a pressure control loop; and obtaining, based on a reference velocity of the hydraulic actuator, an opening signal of the independent metering valve 2 controlled by the implicit controller using a flow control loop;

determining a first residual of the independent metering valve 1 by performing subtraction on the opening signal of the independent metering valve 1 calculated by both the implicit controller and the explicit controller at the same time. and determining a second residual of the independent metering valve 2 by performing subtraction on the opening signal of the independent metering valve 2 calculated by both the implicit controller and the explicit controller at the same time;

identifying whether the independent metering valve 1 and the independent metering valve 2 are faulty by comparing the first residual and the second residual respectively with preset thresholds corresponding to the first residual and the second residual, wherein the obtaining an online estimate value of the first chamber pressure by estimating in the initial state, based on the pressure of two chambers of a hydraulic actuator which different weights are assigned, the first chamber pressure includes:

designing a tracking controller $G_{Tr}$ of the first chamber pressure:

$$G_{Tr} = \frac{2\xi\omega_n s + \omega_n^2}{K_p s^2 + K_i s}$$

where s denotes a transfer function after a Laplace transform of a first differential link, $K_p$ denotes a proportional adjustment coefficient, $K_i$ denotes an integral adjustment coefficient, and $\omega_n$ and $\xi$ denote a closed-loop intrinsic frequency and damping of the tracking controller; and determining the online estimate value according to a following equation:

$$\hat{p}_1 = \frac{G_{Tr}G_{PI}}{1 + G_{Tr}G_{PI}} p_1 + \frac{G_{PI}}{1 + G_{Tr}G_{PI}} (p_{2,ref} - p_2),$$

wherein $$G_{PI} = K_p + K_i \frac{1}{s}, \hat{p}_1$$

denotes the online estimate value, $p_1$ denotes the first chamber pressure, $p_2$ denotes the second chamber pressure, $p_{2,ref}$ denotes a preset target reference pressure, and $G_{PI}$ denotes a proportional integral controller, $$\frac{G_{Tr}G_{PI}}{1 + G_{Tr}G_{PI}}$$

as a weight coefficient responding directly to changes in $p_1$, and $$\frac{G_{PI}}{1 + G_{Tr}G_{PI}}$$

as a weight coefficient responding directly to changes in $(p_{2,ref} - p_2)$;

the obtaining, based on the first chamber pressure, an opening signal of an independent metering valve 1 controlled by the explicit controller includes:

adopting the flow control loop for the independent metering valve 1 controlled by the explicit controller and determining the opening signal of the independent metering valve 1 controlled by the explicit controller according to a following equation:

$$u_1 = u^{-1}(v_{ref}A_1, p_s - p_1),$$

where $u_1$ denotes the opening signal, $v_{ref}$ denotes the reference velocity of the hydraulic actuator, $A_1$ denotes an area of a rodless chamber of the hydraulic actuator, $p_s$ denotes a pressure of the electro-hydraulic system, $p_1$ denotes the first chamber pressure, $u^{-1}(q_{ref}, \Delta p_1)$ denotes a valve opening calibrated in advance using a reference flow and a differential pressure, $q_{ref}$ denotes a product of the reference velocity $v_{ref}$ and the area $A_1$ of the rodless chamber, and $\Delta p_1$ denotes a difference between the pressure $p_s$ of the electro-hydraulic system and the first chamber pressure $p_1$;

the obtaining, based on the online estimate value of the first chamber pressure, an opening signal of the independent metering valve 1 controlled by the implicit controller includes:

adopting the flow control loop for the independent metering valve 1 controlled by the implicit controller and determining the opening signal $u_1'$ of the independent metering valve 1 controlled by the implicit controller according to a following equation:

$$u_1' = u^{-1}(v_{ref}A_1, p_s - \hat{p}_1),$$

where $\hat{p}_1$ denotes the online estimate value of the first chamber pressure, $u^{-1}(q_{ref}, \Delta p_1')$ denotes a valve opening calibrated in advance using a reference flow and a differential pressure, and $\Delta p_1'$ denotes a difference between the pressure $p_s$ of the electro-hydraulic system and the online estimate value $\hat{p}_1$;

the obtaining, based on the second chamber pressure, an opening signal of an independent metering valve 2 controlled by the explicit controller using a pressure control loop includes:

adopting the pressure control loop for the independent metering valve 2 controlled by the explicit controller and determining the opening signal of the independent metering valve 2 controlled by the explicit controller according to a following equation:

$$u_2 = K_p \cdot (p_2 - p_{2,ref}) + K_i \int_t^{t_i} (p_2 - p_{2,ref}) dt,$$

where $u_2$ denotes the opening signal, $p_2$ denotes the second chamber pressure, $p_{2,ref}$ denotes the preset target reference pressure, t denotes an integration starting time, and $t_i$ denotes an integration termination time; and the obtaining, based on a reference velocity of the hydraulic actuator, an opening signal of the independent metering valve 2 controlled by the implicit controller using a flow control loop includes:

adopting the flow control loop for the independent metering valve 2 controlled by the implicit controller and determining the opening signal $u_2'$ of the independent metering valve 2 controlled by the implicit controller according to a following equation:

$$u_2' = u^{-1}(v_{ref}A_2, p_2 - p_r),$$

where $A_2$ denotes an area of a rod chamber of the hydraulic actuator, $p_r$ denotes a return oil pressure, $u^{-1}(q_{ref}', \Delta p_2)$ denotes a valve opening calibrated in advance using a reference flow and a differential pressure, $q_{ref}'$ denotes a product of the reference velocity $v_{ref}$ and the area $A_2$ of the rod chamber, and $\Delta p_2$ denotes a difference between the second chamber pressure $p_2$ and the return oil pressure $p_r$;

determining a flow adjustment amount based on a relationship between the first residual and the preset threshold corresponding to the first residual and a relationship between the second residual and the preset threshold corresponding to the second residual, including:

in response to a determination that the first residual exceeds the preset threshold corresponding to the first residual and the second residual exceeds the preset threshold corresponding to the second residual, updating, based on a second preset rule, the flow adjustment amount, generating, based on an updated flow adjustment amount, at least one of a power source adjustment instruction and an opening adjustment instruction; and adjusting, based on the power source adjustment instruction, a power source flow by adjusting a working volume of a piston within a power source;

adjusting, based on the opening adjustment instruction, a degree of valve spool opening, by the explicit controller.

2. The method of claim 1, wherein the identifying whether the independent metering valve 1 and the independent metering valve 2 are faulty by comparing the first residual and the second residual respectively with preset thresholds corresponding to the first residual and the second residual includes:

determining whether the first residual exceeds the preset threshold corresponding to the first residual;

in response to a determination that the first residual does not exceed the preset threshold corresponding to the first residual, determining whether the second residual exceeds the preset threshold corresponding to the second residual;

in response to a determination that the second residual exceeds the preset threshold corresponding to the second residual, determining that a signal is abnormal; or in response to a determination that the second residual does not exceed the preset threshold corresponding to the second residual, determining that a first chamber pressure sensor of the hydraulic actuator and a second chamber pressure sensor of the hydraulic actuator are fault free.

3. The method of claim 2, wherein the determining whether the first residual exceeds the preset threshold corresponding to the first residual further includes:

in response to a determination that the first residual exceeds the preset threshold corresponding to the first residual, determining whether the second residual exceeds the preset threshold corresponding to the second residual;

in response to a determination that the second residual exceeds the preset threshold corresponding to the second residual, determining that at least the second chamber pressure sensor of the hydraulic actuator is faulty; or in response to a determination that the second residual does not exceed the preset threshold corresponding to the second residual, determining that the first chamber pressure sensor of the hydraulic actuator is faulty.

4. A device for fault diagnosis of a pressure sensor of an electro-hydraulic system with an explicit controller and an implicit controller in parallel, comprising at least one processor and a storage medium, wherein the storage medium is configured to store instructions; and the processor is configured to operate according to the instructions to perform the method for fault diagnosis of a pressure sensor of an electro-hydraulic system with an explicit controller and an implicit controller in parallel according to claim 1.

5. A non-transitory computer-readable storage medium storing a computer program, wherein when executed by a processor, the computer program may perform the method for fault diagnosis of a pressure sensor of an electro-hydraulic system with an explicit controller and an implicit controller in parallel according to claim 1.

6. The method of claim 1, wherein the identifying whether the independent metering valve 1 and the independent metering valve 2 are faulty by comparing the first residual and the second residual respectively with preset thresholds corresponding to the first residual and the second residual includes:

determining, based on vibration data and electrical interference data, a sequence of interference time points through an interference model, wherein the interference model is a recurrent neural network model;

filtering, based on the sequence of interference time points, pressure data at a plurality of consecutive time points acquired by the pressure sensor; and determining, based on filtered pressure data, the first residual and the second residual.

7. The method of claim 6, wherein a training process of the interference model includes:

obtaining, by performing statistics on a large amount of historical vibration data and historical electrical interference data, a statistical result;

determining, based on the statistical result, different sets of training samples; and training the different sets of training samples alternately according to scale sizes, wherein the different sets of training samples have different learning rates during the training process.

* * * * *